United States Patent
You et al.

(10) Patent No.: US 11,465,527 B2
(45) Date of Patent: Oct. 11, 2022

(54) CHARGING CONTROL SYSTEM AND CHARGING CONTROL METHOD OF ELECTRIC VEHICLE

(71) Applicants: HYUNDAI MOTOR COMPANY, Seoul (KR); KIA MOTORS CORPORATION, Seoul (KR)

(72) Inventors: Hyun Jong You, Uiwang-si (KR); Ho Uk Nam, Hwaseong-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 243 days.

(21) Appl. No.: 16/509,215

(22) Filed: Jul. 11, 2019

(65) Prior Publication Data

US 2020/0130528 A1 Apr. 30, 2020

(30) Foreign Application Priority Data

Oct. 24, 2018 (KR) .................. 10-2018-0127412

(51) Int. Cl.
*H02J 7/00* (2006.01)
*B60L 53/64* (2019.01)
*B60L 53/66* (2019.01)
*B60L 53/30* (2019.01)

(52) U.S. Cl.
CPC ............. *B60L 53/64* (2019.02); *B60L 53/305* (2019.02); *B60L 53/66* (2019.02); *H02J 7/0047* (2013.01); *B60L 2250/16* (2013.01)

(58) Field of Classification Search
CPC .......... B60L 53/54; B60L 53/64; B60L 53/66; B60L 53/305; B60L 53/30; B60L 2250/16; H02J 7/0047; H02J 7/00
USPC ......................................................... 320/109
See application file for complete search history.

(56) References Cited

U.S. PATENT DOCUMENTS

| | | | | |
|---|---|---|---|---|
| 6,160,380 A | * | 12/2000 | Tsuji | G01R 31/3648 320/132 |
| 6,166,449 A | * | 12/2000 | Takaoka | B60W 10/08 290/40 B |
| 9,517,705 B1 | * | 12/2016 | Liu | B60L 1/02 |
| 2012/0098497 A1 | * | 4/2012 | Ogane | H01M 10/443 320/134 |

(Continued)

FOREIGN PATENT DOCUMENTS

| | | |
|---|---|---|
| JP | 2012-060712 A | 3/2012 |
| JP | 2017-175810 A | 9/2017 |

(Continued)

*Primary Examiner* — Richard Isla
*Assistant Examiner* — Dung V Bui
(74) *Attorney, Agent, or Firm* — Morgan, Lewis & Bockius LLP

(57) ABSTRACT

The present disclosure relates to a charging control system for an electric vehicle including: an input device for receiving inputs of a demanded charge amount of a battery so as to charge the battery by using a charger; a processor configured to compute an expected charge time required to charge the battery and an expected drivable distance on completion of charging based on the demanded charge amount input to the input device; and an output device for displaying the expected charge time and the expected drivable distance computed by the processor.

16 Claims, 3 Drawing Sheets

(56) References Cited

U.S. PATENT DOCUMENTS

| | | | | |
|---|---|---|---|---|
| 2012/0109515 | A1* | 5/2012 | Uyeki | G01C 21/3469 |
| | | | | 701/423 |
| 2012/0306446 | A1* | 12/2012 | Suganuma | B60L 53/63 |
| | | | | 701/119 |
| 2013/0282472 | A1* | 10/2013 | Penilla | B60S 5/06 |
| | | | | 705/14.35 |
| 2015/0100226 | A1* | 4/2015 | Skaff | B60W 50/14 |
| | | | | 701/123 |
| 2016/0325637 | A1* | 11/2016 | Payne | B60L 50/16 |
| 2017/0008408 | A1* | 1/2017 | Park | B60L 50/52 |
| 2017/0070089 | A1* | 3/2017 | Fukubayashi | H02J 13/00028 |
| 2017/0331321 | A1* | 11/2017 | Kan | B60L 53/00 |
| 2021/0094435 | A1* | 4/2021 | Rechkemmer | H02J 7/00034 |

FOREIGN PATENT DOCUMENTS

| | | |
|---|---|---|
| KR | 10-2002-0003764 A | 1/2002 |
| KR | 10-1270116 B1 | 5/2013 |

* cited by examiner

CHARGING CONTROL SYSTEM AND CHARGING CONTROL METHOD OF ELECTRIC VEHICLE

CROSS REFERENCE TO RELATED APPLICATION

The present application claims the benefit of priority to Korean Patent Application No. 10-2018-0127412, filed on Oct. 24, 2018 with the Korean Intellectual Property Office, the entire contents of which is incorporated herein for all purposes by this reference.

TECHNICAL FIELD

The present disclosure generally relates to a charging control system and a charging control method of an electric vehicle, wherein a user sets a battery charging amount so as to control charging a battery of the electric vehicle.

BACKGROUND

Recently, due to environmental pollution and fossil fuel depletion, the development of environmentally-friendly vehicles driven by a motor is actively being pursued. Particularly, the full-scale production of rechargeable electric vehicles began in step with the development of a secondary battery, and accordingly, the development of the rechargeable electric vehicles has become an important issue.

In a vehicle driven by an internal combustion engine, a fuel amount remaining in a fuel tank, which is indicated by an indicator of a dashboard, is used to estimate a drivable distance, and similarly, in an electric vehicle, the drivable distance is expected based on a charged amount of a battery (a state of charge: SOC).

However, since the conventional charging of the battery is performed simply in a full-charge or 80% charge, it is impossible to make a battery charging plan suitable for a driving plan of a vehicle. Particularly, since the electric vehicle takes considerable time to charge a battery compared to the fuel charging of the internal combustion engine, it is required to make a battery charging plan suitable for driving. Accordingly, in consideration of a driving pattern of a user and an average fuel efficiency of a vehicle, it is required to make the battery charging plan suitable for driving.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a charging control system and a charging control method of an electric vehicle whereby a battery is charged to be suitable for a driving plan of a vehicle, instead of a simple battery charging control system.

In order to achieve the above object, according to an aspect of the present disclosure, a charging control system for an electric vehicle may include: an input device for receiving inputs of a demanded charge amount of a battery so as to charge the battery by using a charger; a processor configured to compute an expected charge time required to charge the battery and an expected drivable distance on completion of charging based on the demanded charge amount input to the input device; and an output device for displaying the expected charge time and the expected drivable distance computed by the processor.

The charging control system may further include: a navigation device setting a drive path when road information is previously stored in the navigation device and a destination is input to the navigation device, wherein the processor may be further configured to compute a required discharge amount of the battery required to reach the destination based on the drive path when the destination is input to the navigation device, and the output device may display the required discharge amount computed by the processor.

The processor may be further configured to compare the computed required discharge amount with a present battery charged amount so as to determine whether charging of the battery is required and compute a required charge amount of the battery required to be charged so as to reach the destination, and the output device may display the computed required charge amount when the processor determines that the battery charge is required.

The processor may be further configured to compute the required discharge amount of the battery based on the road information of the drive path.

The processor may be further configured to divide the drive path into a plurality of sections based on the road information of the drive path and compute the required discharge amount of the battery by using an average fuel efficiency of the electric vehicle set at each of the divided plurality of sections.

The processor may be further configured to compute the expected charge time required to charge the battery up to the demanded charge amount by using battery charging information including a previously set charging method and a previously stored charging record.

The processor may be further configured to compute the expected drivable distance by using an average fuel efficiency of the vehicle based on the demanded charge amount.

The input device may be a slide-type input device configured such that a user manipulates the demanded charge amount by sliding the input device, and the output device may be configured to display in real time the expected charge time and the expected drivable distance changeable according to the demanded charge amount input to the input device.

The output device may be configured to display each of the present battery charged amount and a battery charged amount on the completion of charging according to the demanded charge amount.

State information of a charging station may be input to the input device by telematics, and the processor may be further configured to compute the expected charge time based on input state information of the charging station.

The input state information of the charging station may include at least one of waiting vehicle information or charger information at the charging station, and the processor may be further configured to compute the expected charge time by reflecting a waiting time required to charge the vehicle at the charging station on the basis of the waiting vehicle information and the charger information at the charging station.

According to another aspect of the present disclosure, a charging control method of an electric vehicle may include: receiving inputs of a demanded charge amount of a battery through an input device so as to charge the battery by using a charger; computing, by a processor, an expected charge time required to charge the battery and an expected drivable distance on completion of charging based on the demanded charge amount that is input; and displaying the expected charge time and the expected drivable distance computed by the processor to the user at an output device.

The charging control method may further include: determining whether a destination is input to the navigation device in which road information is previously stored after the inputting, in which when the destination is input to the navigation device, the computing may include computing a required discharge amount of the battery required to reach the destination and a required charge amount of the battery required to be charged to reach the destination based on a drive path, and the displaying may include displaying the computed required discharge and charge amounts.

When the state information of the charging station is input in the computing of the expected charge time and the expected drivable distance, the computing may include computing the expected charge time on the basis of the state information of the charging station.

According to the present disclosure, the charging control system and the charging control method of the electric vehicle allow the demanded charge amount of the battery to be selected based on the expected charge time or the expected drivable distance, thereby enabling a charging plan setting according to a driving plan.

In addition, a user can manipulate the demanded charge amount of the battery intuitively and elaborately and set the demanded charge amount of the battery by selecting the present battery charged amount, the expected drivable distance, and the expected charge time.

Furthermore, when a destination is set on the navigation device, the charging control system displays the required discharge amount of the battery and the required charge amount according to the required discharge amount, which are required to reach the destination by using average fuel efficiency and the state information of the charging station according to a road leading up to the destination, thereby enabling the charging plan setting for driving to the destination.

BRIEF DESCRIPTION OF THE DRAWINGS

The above and other objects, features and other advantages of the present disclosure will be more clearly understood from the following detailed description when taken in conjunction with the accompanying drawings, in which.

Figure 1:
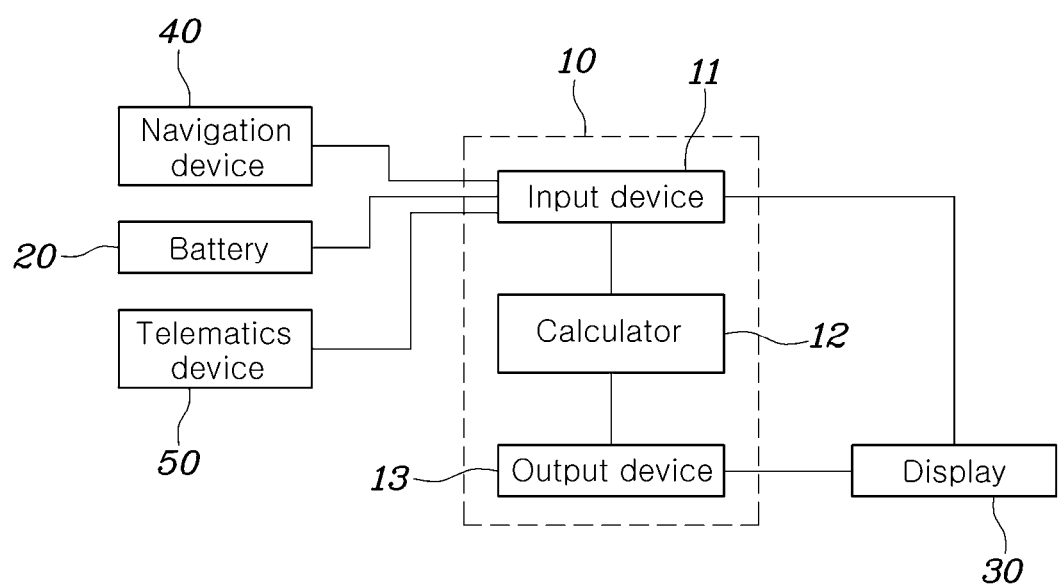
FIG. 1 is a block diagram of a charging control system for an electric vehicle according to an exemplary embodiment of the present disclosure.

It may be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particularly intended application and use environment. In the figures, reference numbers refer to the same or equivalent parts of the present disclosure throughout the several figures of the drawing.

DETAILED DESCRIPTION

Hereinbelow, exemplary embodiments of the present disclosure will be described in detail with reference to the accompanying drawings. Throughout the drawings, the same reference numerals will refer to the same or like parts.

Specific structural and functional descriptions of the embodiment of the present disclosure disclosed herein are only for illustrative purposes of the embodiment of the present disclosure. The present disclosure may be embodied in many different forms without departing from the spirit and significant characteristics of the present disclosure. Therefore, the embodiment of the present disclosure is disclosed only for illustrative purposes and should not be construed as limiting the present disclosure.

Reference will now be made in detail to the embodiment of the present disclosure, a specific example of which is illustrated in the accompanying drawings and described below, since the embodiment of the present disclosure can be variously modified in many different forms. While the present disclosure will be described in conjunction with the exemplary embodiment thereof, it is to be understood that the present description is not intended to limit the present disclosure to the exemplary embodiment. On the contrary, the present disclosure is intended to cover not only the exemplary embodiment, but also various alternatives, modifications, equivalents and other embodiments that may be included within the spirit and scope of the present disclosure as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to", should be construed in the same way.

The terminology used herein is for the purpose of describing a particular embodiment only and is not intended to be limiting. As used herein, the singular forms "a", "an", and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinbelow, exemplary embodiments of the present disclosure will be described in detail with reference to the accompanying drawings. Throughout the drawings, the same reference numerals will refer to the same or like parts.

Figure 2:
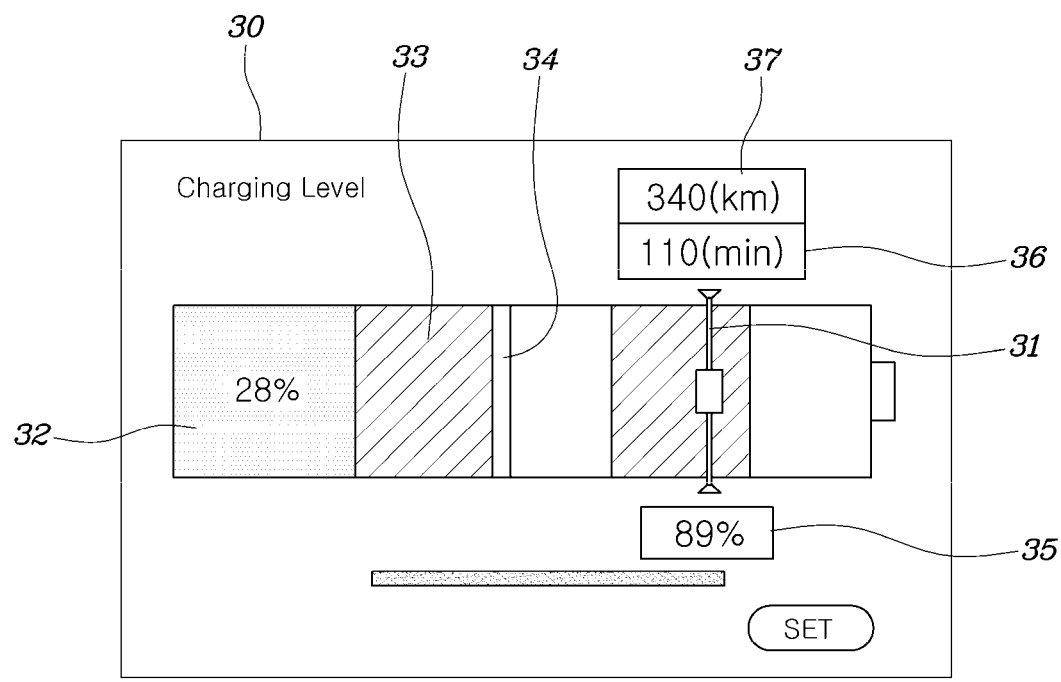
FIG. 2 is a view showing a display of the charging control system for the electric vehicle according to an exemplary embodiment of the present disclosure.

FIG. 1 is a block diagram of a charging control system for an electric vehicle according to the embodiment of the present disclosure, and FIG. 2 is a view showing a display 30 of the charging control system for the electric vehicle according to the embodiment of the present disclosure.

Referring to FIGS. 1 and 2, the charging control system for the electric vehicle according to an exemplary embodiment of the present disclosure includes: an input device 11 to which a user inputs a demanded charge amount 31 of a battery 20 so as to charge the battery 20 by using a charger; a calculator 12 computing an expected charge time 36 required to charge the battery 20 and an expected drivable distance 37 on completion of charging based on the demanded charge amount 31 input to the input device 11; and output device 13 displaying the expected charge time 36 and the expected drivable distance 37 computed by the calculator 12 to the user.

The calculator 12, according to one exemplary embodiment of the present disclosure, can be a processor having an associated non-transitory memory storing software instructions which, when executed by the processor, provides the various functionalities of the calculator 12 described hereinafter.

According to one exemplary embodiment of the present disclosure. The input device 11, the calculator 12 and the output device 13 may be included in a controller 10. The controller 10 as an electronic control device may be a superior controller 10 such as an electronic control unit (ECU), or a control unit such as a battery management system (BMS) additionally controlling the charging of the battery 20.

The processor may take the form of one or more processor(s) and associated memory storing program instructions, and in some examples the one or more processor(s) may be used to implement the functions of both the controller 10 and the processor.

The charger may include a wired charger connected directly to the battery 20 of an electric vehicle so as to charge the battery 20 and a wireless charger wirelessly charging the battery 20 of an electric vehicle parked at a specific position. The controller 10 may transfer/receive data to or from the charger wiredly or wirelessly. The controller 10 can control charging of the charger according to the demanded charge amount 31 of the battery 20, and when the charging of the demanded charge amount 31 that is set is completed, can allow the display 30 or a dashboard to indicate the completion of charging or an alarm to be sounded such that a user recognizes the completion of charging. Accordingly, the controller 10 can control to stop the charger from charging the battery 20 when the charging of the demanded charge amount 31 that is set is completed.

When charging the battery 20 inside of a vehicle by using the charger outside of the vehicle, a user inputs the demanded charge amount 31 of the battery 20 to the input device 11. The user may input the demanded charge amount to the input device 11 by using a button or a sound recognition device, which is provided additionally, and may input the demanded charge amount to the input device 11 by touching the display 30, which will be described later, connected to the output device 13.

The calculator 12 can compute the expected charge time 36 required to charge the battery 20 and the expected drivable distance 37 based on the demanded charge amount 31 which is input. The expected charge time 36 may be time required to charge the battery 20 up to the demanded charge amount 31 according to a charging speed (a slow charge or a boost charge) of the charger.

More particularly, the expected charge time 36 may be obtained by dividing a value subtracting the present battery charged amount from the demanded charge amount 31 by a charge power. The charge power may be different according to the slow charge or the boost charge. The expected drivable distance 37 may be computed based on a battery charged amount 35 on the completion of charging that adds the demanded charge amount 31 to a present battery charged amount 32.

The output device 13 is connected to the display 30 so as to display the expected charge time and the expected drivable distance such that a user recognizes through the display 30. Particularly, The output device 13 displays the expected charge time 36 and the expected drivable distance 37 computed by the calculator 12 such that the user recognizes through the display.

That is, the output device 13 may display the expected charge time 36 and the expected drivable distance 37 according to the demanded charge amount 31 input to the display 30 by the user. Furthermore, the output device 13 may display the present battery charged amount 32 and the battery charged amount 35 on the completion of charging that adds the demanded charge amount 31 to the present battery charged amount 32.

Accordingly, the user recognizes the expected charge time and the expected drivable distance 37 according to the demanded charge amount 31 that is input, and according to the recognition, may modify the demanded charge amount 31 and make a charging plan according to an expected driving plan based on the expected charge time 36 and the expected drivable distance 37, thereby improving driving satisfaction of the user.

The charging control system may further include a navigation device 40 setting a drive path when road information is previously stored in the navigation device and a destination is input to the navigation device 40, wherein when the destination is input to the navigation device, the calculator 12 may compute a required discharge amount 34 of the battery 20 required to reach the destination based on the drive path, and the output device 13 may display the required discharge amount 34 computed by the calculator 12.

The navigation device 40 connected to the input device 11 may transfer the set drive path and data according to the drive path to the input device 11. The navigation device 40 may store the road information in an additional memory or an embedded memory in advance. Alternatively, without the navigation device 40 being installed in a vehicle, an additional wireless communication device may be used to receive the road information and the drive path from a base station.

The destination may be input to the navigation device 40 by a user. When the destination is input to the navigation device 40, the navigation device 40 may set an optimal path or a user selected path as a drive path. The calculator 12 computes the required discharge amount 34 of the battery 20 required to reach the destination based on the drive path. Particularly, the calculator 12 computes the required discharge amount 34 required to drive on the drive path by receiving the drive path and the road information according to the drive path from the navigation device 40.

The output device 13 may display the required discharge amount 34 that is computed. That is, the output device 13 displays the required discharge amount 34 of the battery 20 required to reach the input destination such that a user checks the required discharge amount 34 of the battery 20 required to reach the destination.

Accordingly, the user checks the required discharge amount 34 required to reach the set destination and whether a charged amount of the battery 20 is sufficient for a driving plan so as to remove doubt or worry about sufficiency of the charged amount of the battery 20.

In addition, the calculator 12 may compare the computed required discharge amount 34 with the present battery charged amount 32 so as to determine whether a battery charge is required and compute a required charge amount 33 of the battery 20 required to be charged so as to reach the destination, and the output device may display the computed required charge amount 33 when the calculator 12 determines that the battery 20 is required to be charged.

That is, the calculator 12 can determine whether the required discharge amount 34 of the battery 20 required to reach the destination is greater than the present battery charged amount 32. When the required discharge amount 34 is equal to or greater than the present battery charged amount 32, the calculator 12 computes the required charge amount 33 of the battery 20 required to reach the destination, and the output device 13 can display the computed required charge amount 33. In addition, a warning light of the battery 20 may be lighted to induce a user to charge the battery 20. Additionally, the navigation device 40 may be controlled to display charging stations positioned on the drive path.

Accordingly, a user may be induced to make a charging plan appropriate to a plan for driving to the destination and sufficiently charge the battery 20 in advance for safe driving.

In addition, the calculator 12 computes the required discharge amount 34 and the required charge amount 33 in real time by reflecting a real-time traffic condition input from the navigation device 40 so as to improve precision. Furthermore, when the destination is changed, the required discharge amount and the required charge amount 33 may also be modified according to the changed destination.

Furthermore, to increase precision of the expected charge time 36, state information of a charging station input by telematics may be used.

That is, the state information of a charging station is input to the input device 11 by telematics, and the calculator 12 may compute the expected charge time 36 on the basis of input state information of the charging station.

The state information of a charging station may be input to a telematics device 50, which is connected with the input device 11. The telematics device 50 may be a device for transmitting/receiving device for exchanging information using an internal or external vehicle or a vehicle communication system based on a data communication and a position information system using a satellite.

Particularly, the state information of the charging station may include waiting vehicle information and charger information of the charging station. For example, the waiting vehicle information of the charging station may include a remaining charge time of a vehicle being charged at the charging station, the number of vehicles waiting or reserved for charging at the charging station, and the expected charge time of the vehicles waiting or reserved for charging, and the charger information may include information on whether a charger or a port operates in a normal condition.

The calculator 12 may compute the expected charge time by reflecting a waiting time required to charge the vehicle at the charging station on the basis of the waiting vehicle information and the charger information of the charging station. Accordingly, the state information of the charging station allowing a congestion degree of the charging station to be expected is reflected to the expected charge time 36, whereby the precision of the expected charge time is improved.

In addition, the output device 13 may display the expected charge time 36 reflecting the state information of the charging station on the display 30. Additionally, the congestion degree of the charging station reflecting the state information thereof may be displayed on the display 30.

Referring to the display 30 shown in FIG. 2 as an exemplary embodiment, the output device 13 may display each of the present battery charged amount 32 and a battery charged amount 35 on the completion of charging according to the demanded charge amount 31. That is, as shown FIG. 2, the present battery charged amount 32 (28%) and the battery charged amount 35 (89%) on the completion of charging according to the demanded charge amount 31 of the battery input by a user may be displayed on the display 30.

In addition, the expected charge time 36 (110 min) and the expected drivable distance 37 (340 km) computed based on the demanded charge amount 31 of the battery 20 are displayed, and as the demanded charge amount 31 of the battery 20 is changed, the expected charge time 36 and the expected drivable distance 37 that are displayed may be changed in real time.

Furthermore, when a user sets the destination, the required discharge amount 34 and the required charge amount 33 may be displayed. That is, the required discharge amount 34 required to reach the destination may be displayed for the user to check, and the required charge amount 33 of the battery 20 required according to the required discharge amount 34 and the present battery charged amount 32 may be displayed. The user may input the demanded charge amount 31 referring to the required discharge amount 34 or the required charge amount 33.

Particularly, as shown in FIG. 2, according to one exemplary embodiment of the present disclosure, the input device 11 can be a slide-type input device in which a user manipulates the demanded charge amount 31 by sliding, and the output device 13 may display in real time the expected charge time 36 and the expected drivable distance 37 changeable according to the demanded charge amount 31 input to the input device 11.

When the display 30 is a slide type, the display 30 is manipulated by a slide bar of a bar shape moving leftward/rightward or upward/downward. When the display 30 is a touch type, the display 30 may be manipulated by touching, or when the display 30 includes an additional button, the demanded charge amount 31 may be freely manipulated by manipulation of the button.

Accordingly, a user can manipulate the demanded charge amount 31 elaborately, and can get satisfaction through intuitive interfaces, referring to the expected charge time 36 and the expected drivable distance 37 or the required discharge amount 34 and the required charge amount 33 changeable according to the manipulation.

The calculator 12 may compute the expected drivable distance 37 by using the average fuel efficiency of the vehicle based on the demanded charge amount 31. An average fuel efficiency of a vehicle may be stored previously therein or computed in real time through a recent driving record stored in a memory. That is, the expected drivable distance 37 (km) may be computed by multiplying the demanded charge amount 31 (kWh) by an average fuel efficiency (km/kWh) of a vehicle.

In addition, when a user sets the destination, road/traffic information according to a path driving up to the destination are reflected such that the average fuel efficiency may be set. That is, the calculator 12 can produce the expected drivable distance 37 by multiplying the demanded charge amount 31 (kWh) by an expected average fuel efficiency (km/kWh) reflecting the recent driving record stored in the memory and the road/traffic information.

The calculator 12 may compute the required discharge amount 34 of the battery 20 based on the road information of the drive path. The road information of the drive path may include a gradient and congestion of a road. Furthermore, in consideration of the road information, the average fuel efficiency of a vehicle may be determined and the average fuel efficiency may be used to compute the required discharge amount 34 of the battery 20.

In addition, the calculator 12 may divide the drive path into a plurality of sections based on the road information of the drive path and compute the required discharge amount 34 of the battery 20 by using the average fuel efficiency of the electric vehicle set at each of the divided plurality of sections. For example, the required discharge amount 34 of the battery 20 may be computed by dividing the drive path into three sections as below.

That is, the drive path is divided into a plurality of sections according to the road information, and the average fuel efficiency at each of the divided sections may be used to compute the required discharge amount 34 of the battery 20.

The required discharge amount 34 (kWh)=a first path distance(km)/a first average fuel efficiency(km/kWh)+a second path distance(km)/a second average fuel efficiency(km/kWh) +a third path distance(km)/a third average fuel efficiency(km/kWh).

Accordingly, when the required discharge amount 34 of the battery 20 is computed, precision may be increased. Additionally, the road information may be controlled to be periodically updated according to road information changeable in real time.

The calculator 12 may compute the expected charge time 36 required to charge the battery 20 up to the demanded charge amount 31 by using battery charging information including a previously set charging method and a previously stored charging record.

The charger may have different charging speeds depending on charging methods of the charger. Accordingly, as for the expected charge time 36, charge times according to the boost charge and the slow charge may be displayed. Furthermore, the charging methods of the charger may include the boost charge and the slow charge, and charge power may be set variously in the boost charge, and input voltage and input current may be set variously in the slow charge. Accordingly, as for the expected charge time 36, expected charge times may be displayed according to the charging methods, or a charge time according to a preset charging method may be displayed.

In addition, when the battery 20 is connected to the charger wirelessly or wiredly, the battery 20 can recognize the charging method preset in the charger by detecting the charge power. Accordingly, the charging method may be reflected so as to compute time required to charge the demanded charge amount 31.

Charging information of the battery 20 including a previously stored charging record may be used so as to further improve precision. Particularly, the charger may store the charging information of the battery 20 including the charging record of a vehicle charged previously and transfer the charging information to the controller 10 of the vehicle. In addition, when the charging record of the charger is stored in the vehicle, the charging speed may be expected using the charging record.

That is, the calculator 12 recognizes the charging method by using the charging information of the battery 20 including the charging record stored previously in the controller 10 or the charger and may compute the expected charge time 36. Accordingly, time required to charge the battery 20 up to the demanded charge amount 31 may be computed precisely.

Figure 3:
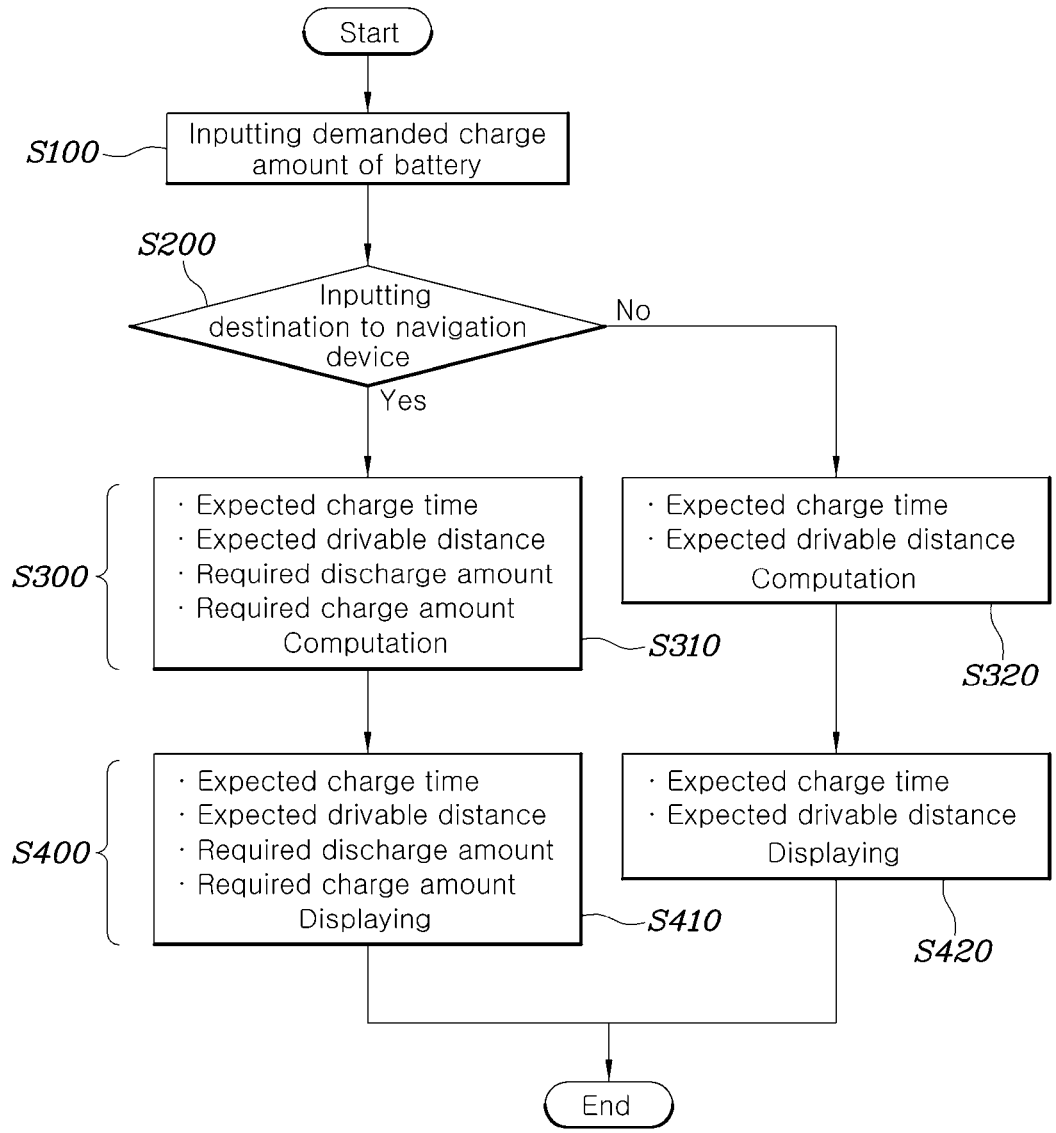
FIG. 3 is a flowchart of a charging control method of the electric vehicle according to an exemplary embodiment of the present disclosure.

FIG. 3 is a flowchart of a charging control method of the electric vehicle according to the embodiment of the present disclosure.

Referring to FIG. 3, according to the embodiment of the present disclosure, the charging control method of the electric vehicle includes: a step S100 of a user inputting the demanded charge amount 31 of the battery 20 to the input device 11 so as to charge the battery 20 by using the charger; a step S300 of computing the expected charge time 36 required to charge the battery 20 and the expected drivable distance 37 on completion of charging at the calculator 12 based on the demanded charge amount 31, which is input; and a step S400 of displaying the expected charge time 36 and the expected drivable distance 37 computed by the calculator 12 to the user at an output device 13.

In addition, after the step S100, the charging control method may further include a step S200 of determining whether the destination is input to the navigation device 40 in which the road information is previously stored.

When the destination is input to the navigation device 40, a step S310 of computing may further compute the required discharge amount 34 of the battery 20 required to reach the destination and the required charge amount 33 of the battery 20 required to be charged to reach the destination based on the drive path, and a step S410 of displaying may further display the required discharge amount 34 and the required charge amount 33 that are computed.

When the destination is not input to the navigation device 40, only the expected charge time 36 and the expected drivable distance 37 are computed at S320 and may be displayed to a user at S420.

According to another embodiment, when the state information of a charging station is input in the computing of the expected charge time and the expected drivable distance, the calculator may compute the expected charge time based on the state information of the charging station.

Particularly, after the step S100 of inputting, a step (not shown) of determining whether the state information of the charging station is input to the input device may be further included, and when the state information of the charging station is input, the calculator may compute the expected charge time on the basis of the state information of the charging station in the computing S300 of the expected charge time and the expected drivable distance.

Since a specific control method is overlapped with the described control method, the overlapped description will be omitted hereinafter.

Although the exemplary embodiment of the present disclosure has been described for illustrative purposes, those skilled in the art will appreciate that various modifications, additions and substitutions are possible, without departing from the scope and spirit of the present disclosure as disclosed in the accompanying claims.

What is claimed is:

1. A charging control system for an electric vehicle, the charging control system comprising:
   an input device for receiving inputs of a demanded charge amount of a battery so as to charge the battery by using a charger;
   a processor configured to compute an expected charge time required to charge the battery and an expected drivable distance on completion of charging based on the demanded charge amount input to the input device;
   an output device for displaying the expected charge time and the expected drivable distance computed by the processor; and
   a navigation device for setting a drive path when road information is previously stored in the navigation device and a destination is input to the navigation device,
   wherein the processor is further configured to:
      compute a required discharge amount of the battery required to reach the destination based on the drive path when the destination is input to the navigation device,
      estimate the required discharge amount of the battery based on the road information of the drive path,
      divide the drive path into a plurality of sections based on the road information of the drive path, and
      compute the required discharge amount of the battery by using an average fuel efficiency of the electric vehicle set at each of the divided plurality of sections, and
   wherein the average fuel efficiency set at each of the divided plurality of sections is determined based on the road information of the drive path including a gradient and congestion of a road.

2. The charging control system of claim 1,
   wherein the output device displays the required discharge amount computed by the processor.

3. The charging control system of claim 2, wherein the processor is further configured to:
   compare the computed required discharge amount with a present battery charged amount so as to determine whether charging of the battery is required; and
   compute a required charge amount of the battery required to be charged so as to reach the destination, and
   the output device displays the computed required charge amount when the processor determines that the battery charge is required.

4. The charging control system of claim 1, wherein the processor is further configured to estimate the expected charge time required to charge the battery up to the demanded charge amount by using battery charging information including a previously set charging method and a previously stored charging record.

5. The charging control system of claim 1, wherein the processor is further configured to estimate the expected drivable distance by using an average fuel efficiency of the vehicle based on the demanded charge amount.

6. The charging control system of claim 5, wherein the processor is further configured to reflect, on the average fuel efficiency, road information or traffic information according to a path of the vehicle to the destination when a destination is input to a navigation device.

7. The charging control system of claim 1, wherein the input device is a slide-type input device configured such that a user manipulates the demanded charge amount by sliding the input device, and
   the output device is configured to display in real time the expected charge time and the expected drivable distance changeable according to the demanded charge amount input to the input device.

8. The charging control system of claim 1, wherein the output device is configured to display each of a present battery charged amount and a battery charged amount on the completion of charging according to the demanded charge amount.

9. The charging control system of claim 1, wherein state information of a charging station is input to the input device by telematics, and
   the processor is further configured to estimate the expected charge time on the basis of input state information of the charging station.

10. The charging control system of claim 9, wherein the input state information of the charging station includes at least one of waiting vehicle information or charger information at the charging station, and
    the processor is further configured to estimate the expected charge time by reflecting a waiting time required to charge the vehicle at the charging station on the basis of the waiting vehicle information and the charger information at the charging station.

11. The charging control system of claim 10, wherein the waiting vehicle information at the charging station includes at least one of a remaining charge time of a vehicle being charged at the charging station, the number of vehicles waiting or reserved for charging at the charging station, or an expected charge time of the vehicles waiting or reserved for charging, and
    the charger information includes information on whether a charger or a port operates in a normal condition.

12. A charging control method of an electric vehicle, the charging control method comprising steps of:
    receiving inputs of a demanded charge amount of a battery through an input device so as to charge the battery by using a charger;
    determining whether a destination is input to a navigation device in which road information is previously stored;
    computing, by a processor, an expected charge time required to charge the battery and an expected drivable distance on completion of charging based on the demanded charge amount that is input; and
    displaying the expected charge time and the expected drivable distance computed by the processor at an output device, wherein:
    the step of computing includes:
       computing a required discharge amount of the battery required to reach the destination and a required charge amount of the battery required to be charged to reach the destination based on a drive path when the destination is input to the navigation device;
       estimating the required discharge amount of the battery based on the road information of the drive path;
       dividing the drive path into a plurality of sections based on the road information of the drive path; and
       computing the required discharge amount of the battery by using an average fuel efficiency of the electric vehicle set at each of the divided plurality of sections, and the average fuel efficiency set at each of the divided plurality of sections is determined based on the road information of the drive path including a gradient and congestion of a road.

13. The charging control method of claim 12, wherein the step of displaying includes displaying the computed required discharge and charge amounts.

14. The charging control method of claim 12, wherein when state information of a charging station is input in the computing of the expected charge time and the expected drivable distance, the step of computing includes estimating the expected charge time on the basis of the state information of the charging station.

15. The charging control method of claim 14, wherein the input state information of the charging station includes at least one of waiting vehicle information or charger information at the charging station, and the step of computing further includes estimating the expected charge time by reflecting a waiting time required to charge the vehicle at the charging station on the basis of the waiting vehicle information and the charger information at the charging station.

16. The charging control method of claim 15, wherein the waiting vehicle information at the charging station includes at least one of a remaining charge time of a vehicle being charged at the charging station, the number of vehicles waiting or reserved for charging at the charging station, or an expected charge time of the vehicles waiting or reserved for charging, and the charger information includes information on whether a charger or a port operates in a normal condition.

\* \* \* \* \*